United States Patent
Palese et al.

(10) Patent No.: US 10,124,466 B2
(45) Date of Patent: Nov. 13, 2018

(54) GRINDING MOTOR AND METHOD OF OPERATING THE SAME FOR RAIL APPLICATIONS

(71) Applicant: HARSCO CORPORATION, Camp Hill, PA (US)

(72) Inventors: Joseph Palese, Sewell, NJ (US); Christopher Hartsough, Mount Laurel, NJ (US)

(73) Assignee: HARSCO CORPORATION, Camp Hill, PA (US)

( * ) Notice: Subject to any disclaimer, the term of this patent is extended or adjusted under 35 U.S.C. 154(b) by 336 days.

(21) Appl. No.: 14/519,571

(22) Filed: Oct. 21, 2014

(65) Prior Publication Data

US 2015/0111472 A1    Apr. 23, 2015

Related U.S. Application Data

(60) Provisional application No. 61/893,546, filed on Oct. 21, 2013.

(51) Int. Cl.
| | | |
|---|---|---|
| *E01B 31/17* | (2006.01) | |
| *B24B 49/02* | (2006.01) | |
| *B24B 49/12* | (2006.01) | |
| *B24B 19/00* | (2006.01) | |
| *G01B 11/24* | (2006.01) | |

(52) U.S. Cl.
CPC ............ *B24B 49/12* (2013.01); *B24B 19/004* (2013.01); *E01B 31/17* (2013.01); *G01B 11/24* (2013.01)

(58) Field of Classification Search
CPC ....... B24B 19/004; B24B 49/12; E01B 31/12; E01B 31/13; E01B 31/15; E01B 31/175
See application file for complete search history.

(56) References Cited

U.S. PATENT DOCUMENTS

| | | | | | |
|---|---|---|---|---|---|
| 4,115,857 | A | * | 9/1978 | Panetti | .................... E01B 31/12 451/347 |
| 4,492,059 | A | * | 1/1985 | Panetti | .................... E01B 31/17 451/178 |
| 4,531,837 | A | * | 7/1985 | Panetti | ............... G01B 11/2518 356/394 |

(Continued)

FOREIGN PATENT DOCUMENTS

| | | |
|---|---|---|
| CN | 103343497 A | 10/2013 |
| JP | 2009215764 A | 9/2009 |

OTHER PUBLICATIONS

International Search Report and Written Opinion, PCT/US2014/061507, dated Jan. 28, 2015, 15 pages.

(Continued)

*Primary Examiner* — Joseph J Hail
*Assistant Examiner* — Jon Taylor
(74) *Attorney, Agent, or Firm* — Baker & McKenzie LLP

(57) ABSTRACT

Methods and apparatus for orienting and operating grinding motors and their associated mechanical parameters for rail applications are described. A method for determining a parameter for operation of grinding motors on a grinding vehicle, may include: receiving a rail profile, comparing the rail profile with a target rail template to provide a comparison result, and determining, by a processor, based on the comparison result, one or more of a grinding motor's orientation, power, and speed.

20 Claims, 9 Drawing Sheets

(56) References Cited

U.S. PATENT DOCUMENTS

| | | | | |
|---|---|---|---|---|
| 4,583,327 A * | 4/1986 | Jaeggi | ...................... | E01B 31/17 451/347 |
| 4,779,384 A | 10/1988 | Shoenhair et al. | | |
| 4,785,589 A * | 11/1988 | Buhler | ................... | E01B 31/17 451/28 |
| 4,905,422 A * | 3/1990 | Panetti | ................... | E01B 31/17 451/347 |
| 5,086,591 A * | 2/1992 | Panetti | ................... | E01B 31/17 451/24 |
| 5,134,808 A * | 8/1992 | Panetti | ................... | E01B 31/17 451/28 |
| 5,140,776 A * | 8/1992 | Isdahl | ................. | B24B 19/004 451/429 |
| 5,359,815 A * | 11/1994 | Schrunk, III | ........... | E01B 31/17 451/347 |
| 6,033,291 A * | 3/2000 | Mathison | ................ | E01B 31/17 15/54 |
| 7,156,723 B2 * | 1/2007 | Natarajan | .......... | G06Q 30/0284 451/347 |
| 2005/0279240 A1 | 12/2005 | Pedanekar et al. | | |
| 2009/0112487 A1 * | 4/2009 | Zhang | ..................... | B61K 9/08 702/34 |
| 2009/0132179 A1 * | 5/2009 | Fu | ....................... | G01M 99/007 702/34 |
| 2010/0007551 A1 * | 1/2010 | Pagliuco | .................. | B61K 9/08 702/189 |
| 2011/0064273 A1 * | 3/2011 | Zarembski | ............... | B61K 9/08 382/104 |

OTHER PUBLICATIONS

Zhi, S., et al., "Towards a Better Understanding of the Rail Grinding Mechanism," Proceedings of the ASME 2013 Rail Transportation Division Fall Technical Conference, RTDF2013, Oct. 15-17, 2013, Altoona, Pennsylvania, USA, RTDF2013-4705, 11 pages.

First Office Action dated Feb. 14, 2017 by the State Intellectual Property Office of People's Republic of China in connection with PRC Application No. 201480058025.5.

An extended European Search Report issued by the European Patent Office dated Sep. 29, 2017 in connection with European Patent Application No. 14855115.3.

* cited by examiner

GRINDING MOTOR AND METHOD OF OPERATING THE SAME FOR RAIL APPLICATIONS

CROSS REFERENCE TO RELATED APPLICATION

This application claims priority to U.S. Provisional Application No. 61/893,546, filed on Oct. 21, 2013, which is incorporated herein by reference in its entirety.

BACKGROUND

Railroads are typically constructed to include a pair of elongated, substantially parallel rails, which are coupled to a plurality of laterally extending ties. The ties are disposed on a ballast bed of hard particulate material such as sharp edged granite. Over time, normal wear and tear on the railroad may cause the rails to develop surface defects and deform in shape.

Rail grinders are track vehicles typically used to shape the transverse section of the rail to control the wheel/rail interface and to remove longitudinal surface defects. Grinding motors may be handheld, cart mounted, or part of rail-bound machines. Rail-bound grinders have motor configurations that typically range from 10 to 96 grinding motors. These motors can be oriented at predefined angles to the cross sectional profile of the rail and have varying horsepower.

BRIEF SUMMARY

The present disclosure is directed to improved systems and methods for use in rail track maintenance such as grinding.

In an embodiment, a method for determining a parameter for operation of grinding motors on a grinding vehicle includes: receiving a rail profile, comparing the rail profile with a target rail template to provide a comparison result, and determining, by a processor, based on the comparison result, one or more of a grinding motor's orientation, power, and longitudinal speed.

In another embodiment, a method for determining a grinding operation of grinding motors on a grinding vehicle includes: receiving data associated with rail profile, determining a corrugation attribute of the rail profile data, determining whether the corrugation attribute indicates the presence of corrugation that can be removed by grinding, grinding the rail for profile if it is determined that the corrugation attribute indicates the presence of corrugation that cannot be removed by grinding, and grinding the rail for corrugation if it is determined that the corrugation attribute indicates the presence of corrugation that can be removed by grinding.

In another embodiment, a rail grinding vehicle includes a first grinding motor and a second grinding motor. The first grinding motor is configured to be positioned relative to a rail at an orientation selected based on a comparison of a profile of the rail and a rail template. The second grinding motor is configured to be positioned relative to the rail at an orientation selected based on a comparison of a model of the rail template updated to estimate metal removed by the first grinding motor and a rail template.

BRIEF DESCRIPTION OF THE DRAWINGS

Embodiments are illustrated by way of example in the accompanying figures, in which like reference numbers indicate similar parts, and in which.

DETAILED DESCRIPTION

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

To facilitate the understanding of this disclosure, a number of terms are defined below. Terms defined herein have meanings as commonly understood by a person of ordinary skill in the areas relevant to the present disclosure. Terms such as "a", "an", and "the" are not intended to refer to only a singular entity, but include the general class of which a specific example may be used for illustration. The terminology herein is used to describe specific embodiments of the disclosure, but their usage does not limit the disclosure, except as outlined in the claims.

The present disclosure is directed to a process for automating grinding motor orientation. In one embodiment, the process utilizes rail profile inspection systems, transverse (cross-section) and longitudinal (corrugation, surface waves), and predictive metal removal equations, to provide a desired orientation and horsepower of the motors, as well as the appropriate grinding train speed.

Various embodiments of a process for determining grinding motor orientation, horsepower, and/or speed are described and rail machines incorporating such process according to the present disclosure are described. It is to be understood, however, that the following explanation is merely exemplary in describing the devices and methods of the present disclosure. Accordingly, several modifications, changes and substitutions are contemplated.

The process described herein may be implemented on a rail-bound machine dedicated to rail grinding processes. In other embodiments, the grinding motors may be associated with other types of rail machines. The rail machine with grinding motors may be used with an operator, or in other embodiments, the rail machine with grinding motors may be operated as a drone vehicle (i.e., without a human operator).

Figure 1:
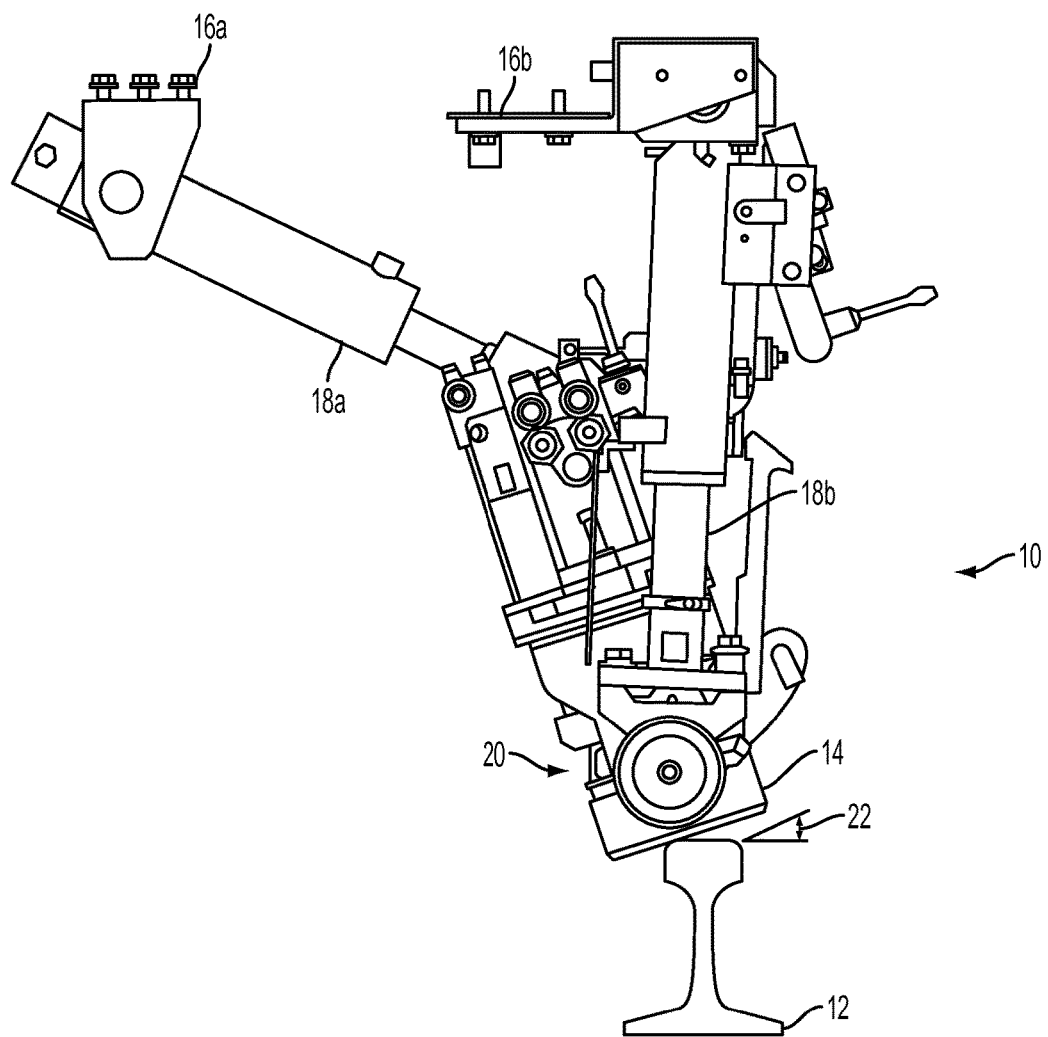
FIG. 1 is a side view of an exemplary rail grinding motor found on a rail grinder.

FIG. 1 is a side view of a rail grinding motor 10. Rail grinding motor 10 is shown in partial view and a rail grinding apparatus may include many grinding motors coupled to a rail vehicle operable to travel, for example self-propelled, down the rail. A rail 12 is shown in cross-section. An orientation of a grinding head 14 may be controlled relative to the rail 12. The rail grinding motor 10 may be coupled to a rail vehicle by the mounts 16a and 16b. Actuators 18a and 18b coupled between the grinding head 14 and the rail vehicle may control the vertical and lateral orientation of the grinding head 14 relative to the rail 12. An actuator 20 may control an angle 22 of the grinding head 14 relative to the rail 12.

Figure 2:
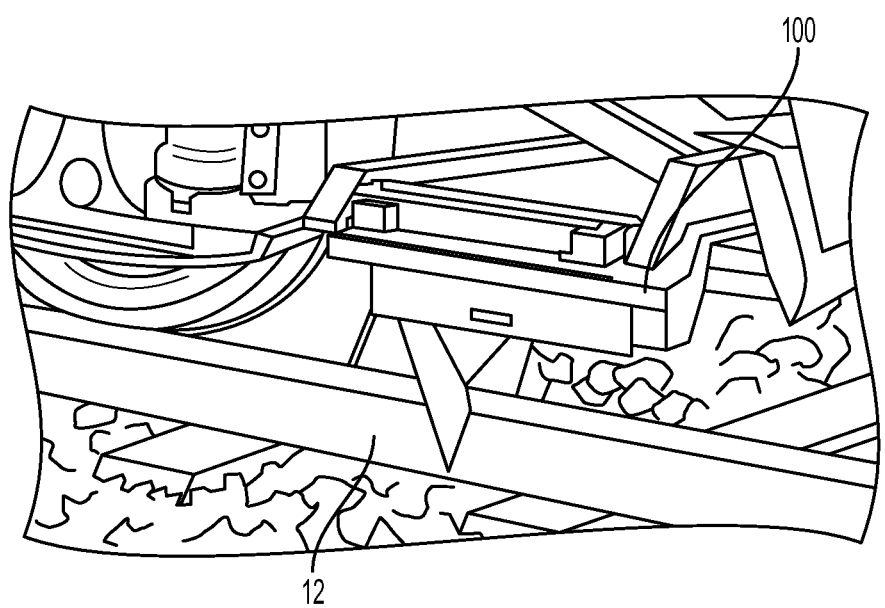
FIG. 2 is a perspective view of an exemplary measurement system.

FIG. 2 is a perspective view of an exemplary rail measurement system. The rail vehicle may include a measurement system 100. The measurement system 100 may obtain a profile measurement of the rail 12. It may be, for example, a camera system, a laser measurement system, or any other system that can obtain a dataset representative of a transverse profile of the rail. The dataset may be recorded with reference to a particular position of the rail by reference to an encoder wheel that is coupled to the rail. The measurement system 100 may operate continuously or may measure the rail profile periodically, for example every 3 m.

Figure 3:
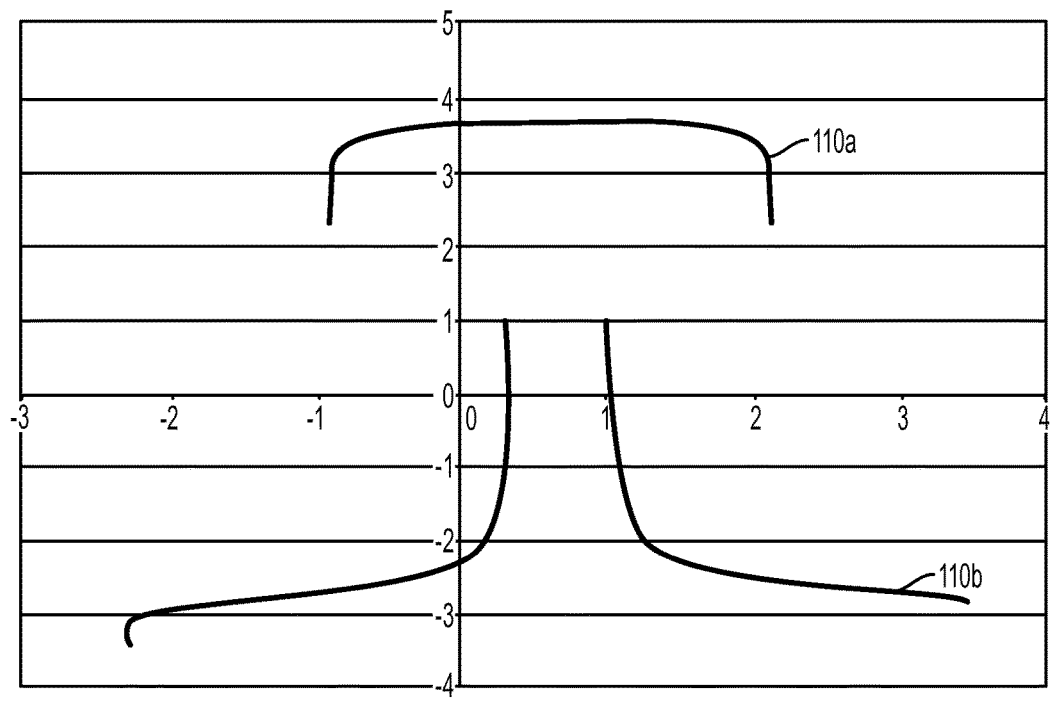
FIG. 3 is a graph of an exemplary rail profile.
Figure 4:
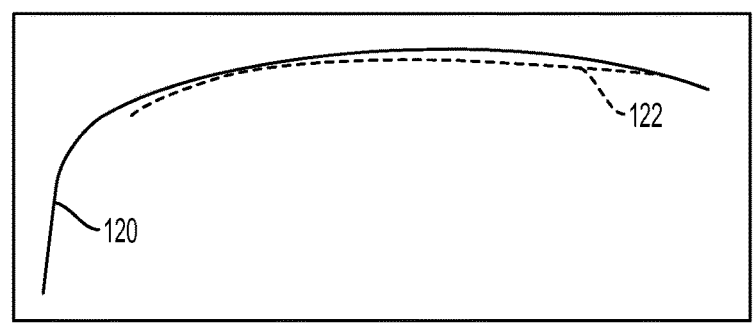
FIG. 4 is a graph of an exemplary measured rail profile and an exemplary target rail template.

The process according to the present disclosure may utilize real-time transverse profile measurements (e.g., returned in Cartesian coordinates via laser based rail profile measurement systems, or by other systems) as well as rail corrugation measurements (rail surface anomalies via acceleration or displacement data), to determine a manner of grinding for profile and/or corrugation. FIG. 3 depicts an exemplary transverse profile measurement of a given rail on a coordinate grid. Depending on the measurement system 100, the profile measurement may be continuous or may be provided in a plurality of sections 110a, 110b, etc. The number of sections (from one to many) may depend on the field of view and number of measurement sensors. FIG. 4 depicts a selected target rail template 122 aligned against a measured rail profile 120, for example on a left side region of the top of the rail such as section 110a. The rail template may be a transverse shape of the rail.

Figure 5:
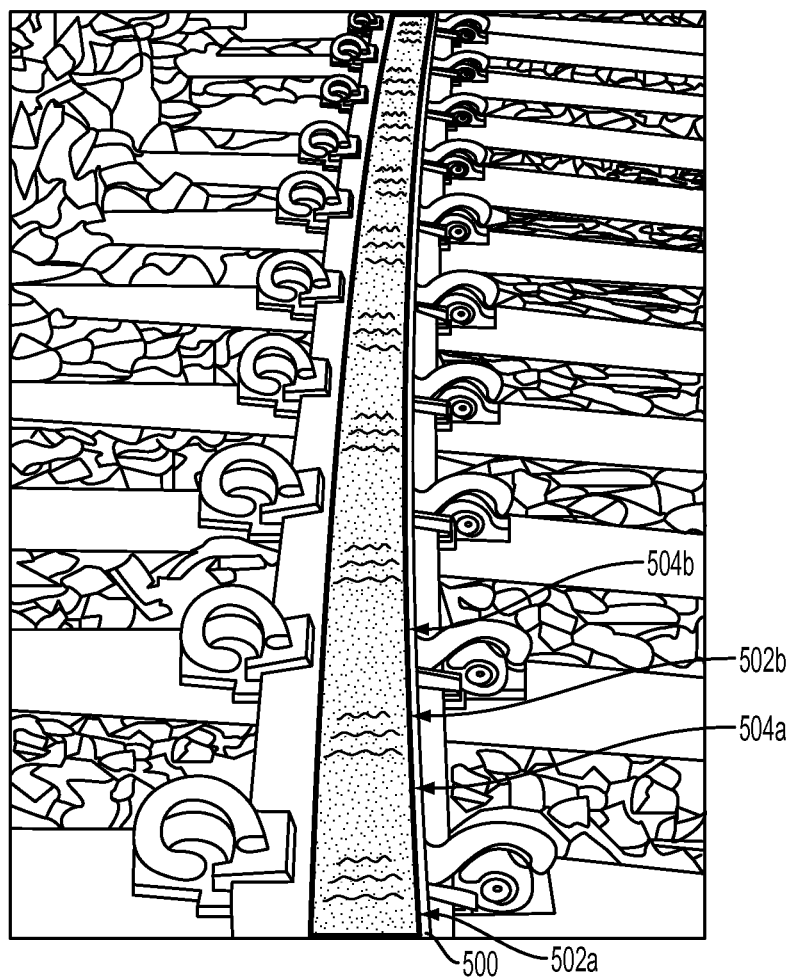
FIG. 5 is a perspective view of an exemplary rail with corrugation.
Figure 6:
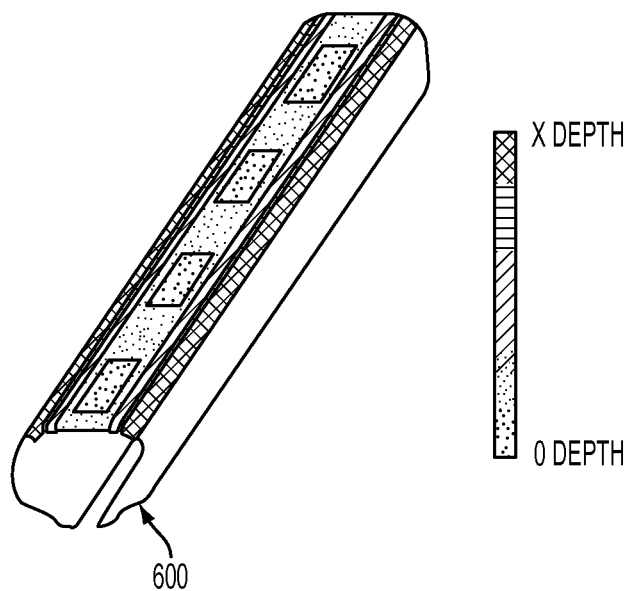
FIG. 6 is a perspective view of a generalized heat map visualization of an exemplary rail corrugation.

Referring to FIGS. 5 and 6, one problem that may be encountered is rail corrugation along a longitudinal profile of a rail 500, 600. FIG. 5 is a perspective view of an exemplary rail 500 with corrugation (e.g., raised areas 502a, 502b and depressed areas 504a, 504b, and FIG. 6 illustrates rail corrugation of a rail 600 as a function of depth in a generalized heat map visualization. Rail corrugation may be removed or reduced by rail grinding to flatten the corrugation. The rail may be ground by positioning one of more rail grinding motors on the rail to reshape the rail.

The amount of metal removed from the rail by each individual motor is dependent upon a number of factors, such as the horsepower of the motor that, influence the amount of metal removed during grinding, including the speed of the vehicle, the makeup of the grinding stone, the hardness of the rail, initial shape of the rail as well as others. The speed of the rail-bound vehicle significantly affects the amount of metal removed during grinding, and is, in practice, one of the easier parameters to adjust to control the amount of metal removed.

Figure 7:
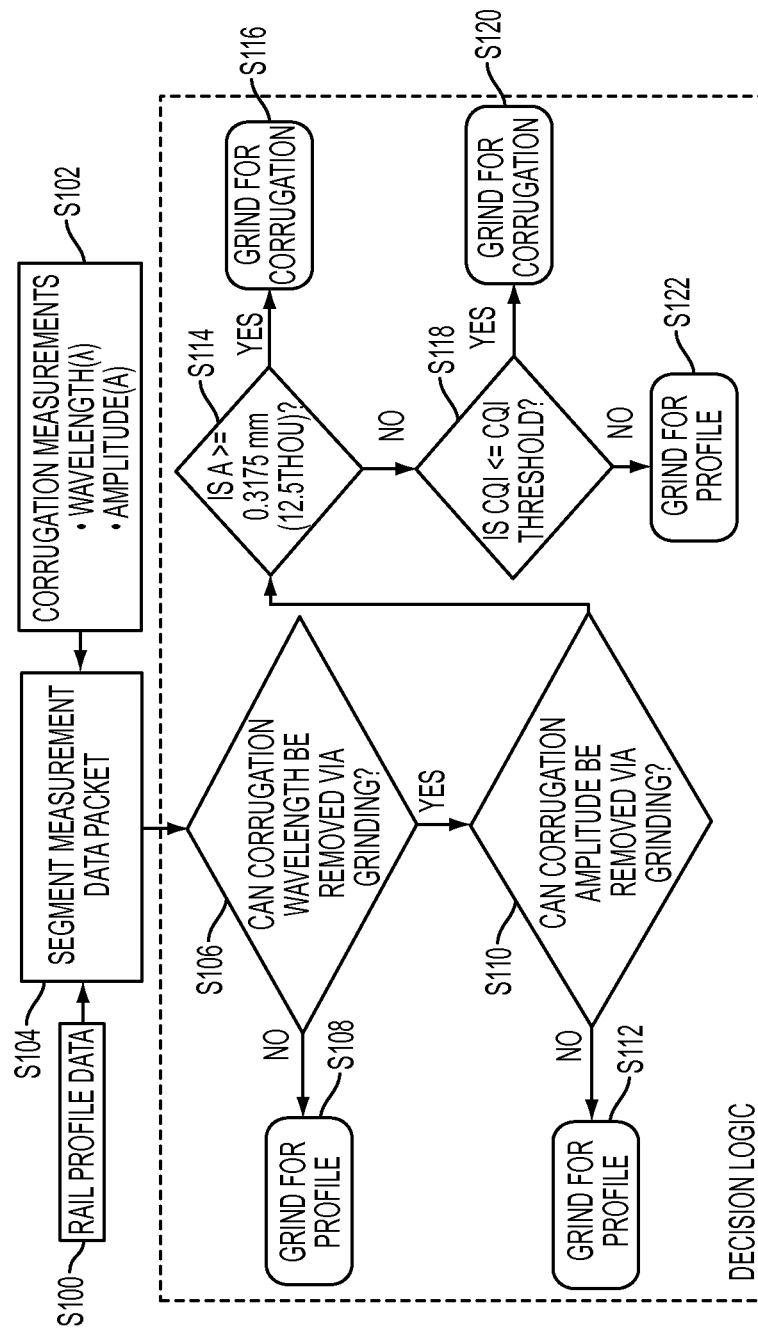
FIG. 7 is a flow chart of an exemplary process for determining grinding mode.

An exemplary process for determining grinding mode selection is depicted in FIG. 7. One possible grinding mode is to grind for profile. Grinding for profile includes shaping multiple surfaces of the rail, for example the top and side of the rail, in the same operation to seek a desired finished profile. Another possible grinding mode is to grind for corrugation. Grinding for corrugation includes prioritizing flattening of the top of the rail to reduce corrugation by positioning more or all of the grinding motors (thereby increasing total metal removal) on the top of the rail. A grinding for corrugation operation may be followed by a grinding for profile operation, or vice versa. Alternatively, only a grind for profile mode may be used, or only a grind for corrugation mode may be used. If corrugation amplitude and wavelength measurements indicate that sufficient corrugation is present that can be removed via grinding, the grinding motors may be oriented to remove corrugation before adjusting profile.

At steps S100 and S102, rail profile data and corrugation measurements are provided, for example by the measurement system 100. Corrugation measurements may include wavelength and amplitude measurements. At step S106, it is determined whether the wavelength may be removed by grinding through a comparison of the corrugation wavelength to the size of the grinding stone. If the wavelength may not be removed by grinding, then the grinding for profile mode is selected at step S108. If the wavelength may be removed by grinding, then the process proceeds to step S110, where it is determined whether the corrugation amplitude may be removed by grinding while preserving the work hardened layer of the rail. If the amplitude may not be removed by grinding, then the grinding for profile mode is selected at step S112. If the amplitude may be removed by grinding, then the grinding mode logic may assess whether the amplitude (A) of the corrugation is above a certain defined value (e.g., 0.3175 mm) at step S114. If the amplitude is above the defined value, then grinding for corrugation is selected at step S116. If the measured corrugation does not indicate that corrugation grinding should be applied, then a corrugation quality index (CQI) may be determined as step S118. An example of a CQI is a ratio of generated vs. acceptable dynamic impact based on the measured corrugation data. Individual railroads may define a CQI threshold that matches their individual standards. If the CQI is at or below the threshold, then grinding for corrugation is selected at step S120. If the CQI is above the threshold, then grinding for profile is selected at step S122.

If corrugation grinding is required, the number of passes (sequential travel over the same site) required to prepare the segment for profile grinding may be recommended to the operator. Note, the number of passes may be dependent on the number and power of the motors on the grinder. After corrugation grinding, if required, recommendations are made to the operator on the grinding pattern and grinder speed to reshape the transverse cross section of the rail to the desired shape (template). Depending on the number of grinding motors on the rail-bound grinder, the process may also predict the number of passes, and for each pass, define the grinding pattern (e.g., orientation of the grinding motors, grinding motor power) and grinder speed.

When it is time to grind for profile, grinding patterns may be automatically generated to bring the transverse rail profile to a target rail template, either to an exact match, or to within some tolerance. These tolerances may include matching a selected profile template or optimizing passes based on user tolerances. The matching selected profile template approach may include infinite passes, for example using a chasing the peak grinding method such as that discussed in more detail with respect to FIG. 8.

The optimizing the passes based on user tolerances may include specifying the number of passes, using a Grinding Quality Index (GQI) target, or using a target resource utilization technique. An example of a GQI is a ratio of the difference curve to an acceptability curve. The number of passes approach may include an optimal location grinding method, which may prioritize grinding on the most critical areas of the rail head, either the top of rail, gage face, gage corner, or field side. The GQI approach may include the optimal location grinding method and/or the chase the peak grinding method having a sufficient number of passes to achieve the GQI target. The target utilization approach may consider historical fuel, stone, and other usage figures to estimate the cost of the grinding operation. The grinding may stop when a certain cost for grind threshold is reached. In any of the above approaches, optimization logic may favor specific areas of the rail such as the gage corner for priority grinding when limitations are applied.

Figure 8:
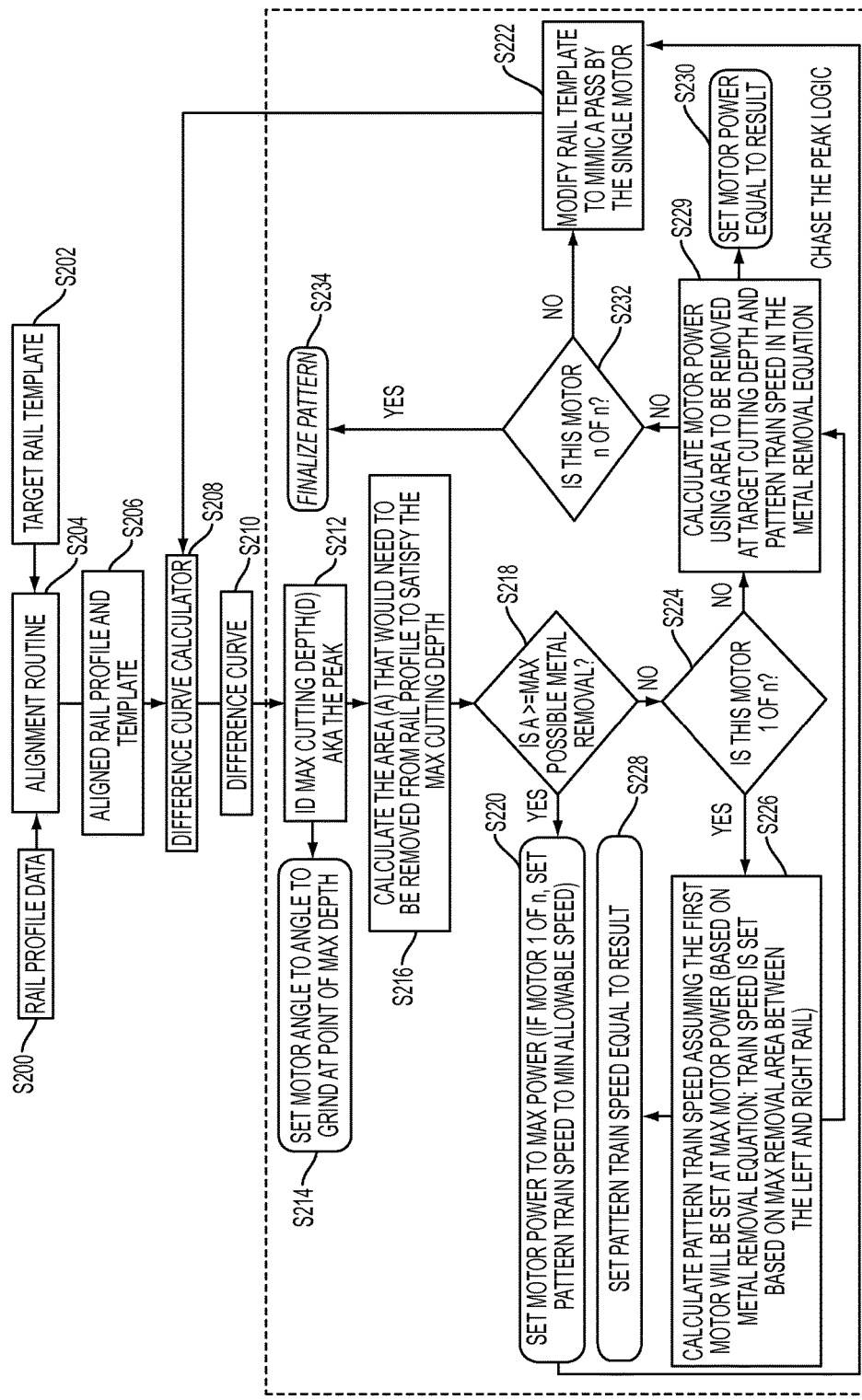
FIG. 8 is a flow chart of an exemplary process for determining grinding motor orientation for profile grinding.

Referring to FIG. 8, a chasing the peak targeted grinding method is described, which may include positioning and calibrating grinding motors in such a way as to grind the highest point on a difference curve (e.g., a normal difference between a measured transverse profile and a desired profile such as a template) as seen by each passing motor. The chase the peak logic utilizes information on the amount of metal needed to be removed from the rail to match a selected target template (a difference curve). The process may be an iterative process for n motors.

At steps S200 and S202, rail profile data and a target rail template are provided. At step S204, the rail profile data and the target rail template are aligned utilizing, for example, an area minimization routine (see, for example, FIG. 4) to provide an aligned rail profile and template at step S206. At step S208, a difference curve between the rail profile data and the target rail template is calculated to provide a difference curve at step S210. The difference curve may identify the depth of material to be removed along the transverse surface of the measured rail profile in relation to the target rail template.

The difference curve may be utilized to identify a point on the rail profile where the maximum amount of metal needs to be removed at step S212. Based on this location, at step S214, the motor angle may be set so that contact is made at that location on the rail. At step S216, the area of metal that would be removed from the profile if the rail was ground down an amount equal to the peak depth is calculated. This calculation identifies the point of contact on the measured rail profile based on the location identified in step S212 and calculates the area removed by projecting the motor angle into the rail. At step S218, this area value is compared to a maximum possible metal removal area (determined using predictive metal removal equations). If this area is greater than the maximum possible metal removal area, the grinding motor is set to maximum power at step S220. In the event that the removal area is greater than the maximum possible area to be removed, the grinding vehicle is set to its slowest speed also at step S220. The rail profile is modified to mimic a pass by the single motor at step S222 and the process returns to step S208 to recalculate the difference curve (now estimated) following the metal removal by the preceding grinding motors set by this pass of the process and for continued determination of the orientation of remaining grinding motors.

If the area to be removed is less than the max, the grinding rail vehicle speed can be increased. If this is the first motor of the pattern (step S224), the grinding rail vehicle speed (e.g., "train speed") is also determined from the metal removal equations for the pass based on the max area to be removed between the left and right rails (step S226) and the pattern train speed is set to the determined result (step S228).

As step S229, the train speed and the area to be removed are passed through the metal removal equation to determine the desired setting for the motor's power to obtain the target cutting depth. The motor's power will be maxed out if the area to be removed is greater than the maximum possible area that can be removed, set to the minimum motor power if the area to be removed is less than the minimum area that can be removed, or set to a determined specific power if the area lies between the minimum and maximum areas that can be removed at the specified grinding vehicle speed. At step S230, the power of the grinding motor is set to the determined motor power.

As mentioned above, this may be implemented as an iterative process which is applied to each of n grinding motors on the grinder. At step S232, if this is motor n of n, the pattern is finalized at S232 and passed to the grinder's control software to physically set the grinding motors to correspond to the profile pattern (for example, by using the actuators 18a, 18b and 20). If this is not motor n, the rail profile in memory is modified to simulate the passing of a grinding stone at the determined orientation and power at step S222. This new profile is then used to recalculate the difference curve at step S208 and pass that difference curve to a next iteration of the chase the peak logic.

The above-described process may create a set of orientations for grinding motors that does not depend on a pre-determined pattern from a library of patterns. That is, the arrangement of the grinding motors is set individually, per motor, in an iterative fashion, based on the measured difference between the rail profile and the target profile in the first iteration. In subsequent iterations, the measured rail profile is updated to an estimated profile that takes into account the metal removing effect of the previously determined grinding motor orientations. This approach allows for greater flexibility in the placement of grinding motors because they are not fixed to predetermined patterns. The pattern may be customized to the specific condition of the rail and optimized for specific conditions encountered in the field. This approach is not limited by a small number of predetermined patterns that could be made available to the grinding train. And, as compared to a large library of predetermined patterns, a solution can be found more quickly than sorting through numerous predefined patterns, which may not be practically implemented in near-real time due to computational limitations.

Additionally, analyzing the metal removal effect of each motor as its orientation is determined also takes advantage of the sequential effect of the grinding motors. That is, when one grinding motor passes over the rail, it removes material that subsequent grinding motors will not encounter. Thus, the needed power and orientation of the subsequent grinding motors is affected by the order in which the grinding motors encounter the rail. Simply comparing a current profile and a target profile to select a grinding profile from a library of profiles does not take into account the impact of the sequence the grinding motors are applied to the rail, nor does it take into account the initial transverse shape of the rail. For example, a generic pattern may have unnecessary motor power applied at certain points in the grinding train, which leads to inefficiencies or deteriorated results of the grinding operation.

FIG. 9 shows two passes in an exemplary chase the peak method. The motor contact points are indicated on the rail profiles with the corresponding difference curve for each pass shown below the profile.

Figure 9A:
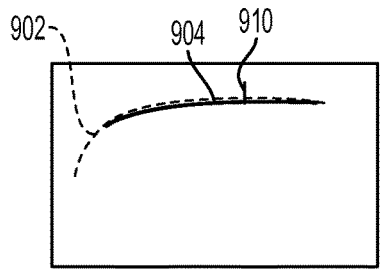
FIG. 9A is a graph of an exemplary rail profile and exemplary target rail template.
Figure 9B:
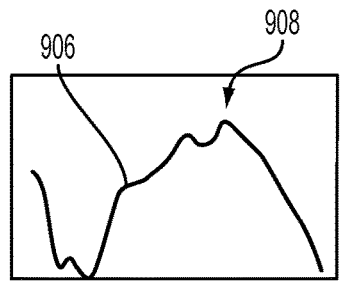
FIG. 9B is a graph of an exemplary difference curve for the profile and target template of FIG. 9A.

Referring to FIG. 9A, a rail profile 902 and a target rail template 904 are shown. A difference between the rail profile 902 and target rail template 904 is shown as the difference trace 906 in FIG. 9B. The peak, or largest magnitude difference, is found on the difference trace 906 at point 908. A grinding motor's orientation, which may include both a contact point and contact angle, is set at point 910 on the rail corresponding to the peak 908 in the difference trace 906.

Figure 9C:
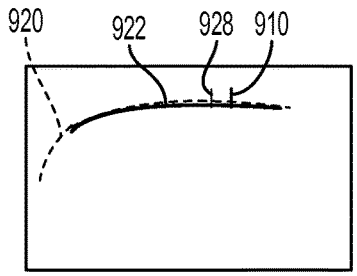
FIG. 9C is a graph of an exemplary rail profile in an iteration after that of FIG. 9A and an exemplary target rail template.
Figure 9D:
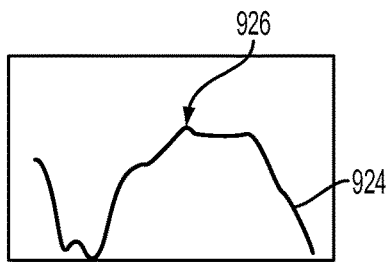
FIG. 9D is a graph of an exemplary difference curve for the profile and target template of FIG. 9C.

After determining the orientation and power of the grinding motor at point 910, the metal removal equation is used to estimate the rail profile with the application of the grinding motor at 910. The estimated rail profile 920 and the target rail template 922 are shown in FIG. 9C. A difference between the rail profile 920 and target rail template 922 is shown as the difference trace 924 in FIG. 9D. The peak, or largest magnitude difference that was previously at point 908 in FIG. 9B has been reduced due to the placement of the grinding motor at point 910. Thus, the peak in the difference trace 924 has moved to point 926. A grinding motor orientation is set at point 928 corresponding to the peak 926 in the difference trace 924. This process may be repeated for n motors, until the difference curve meets certain criteria such as GQI or another finishing criteria has been met.

A predictive model which estimates area of metal removed by a grinding stone based upon grinding grit theory and experimental measurements may be leveraged in the above-described process. The metal removal area equation (MRE) is an extrapolation of the results of grinding experimentation done using grinding setups which produce specific grinding grit cutting depths. This experimentation was conducted in such a way as to represent the effect of train speed in grinding area removal.

Figure 10:
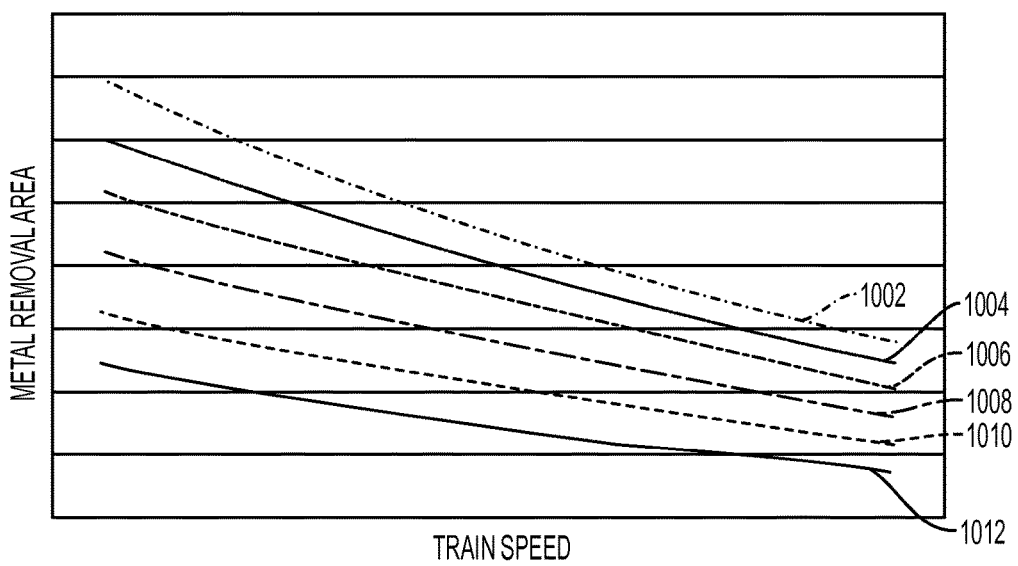
FIG. 10 is a graph of an exemplary expected removal area for a given train speed and grinding grit cutting depth.

Referring to FIG. 10, the metal removal area for various grinding grit cutting depths 1002, 1004, 1006, 1008, 1010, 1012 is shown as a function of train speed. The MRE may be used in at least three ways. One, the train speed may be determined for a pattern based on a maximum area to be removed for the pass. Two, the MRE may be used to forecast the power a motor should be set at to remove a targeted amount of material. To achieve a certain cutting depth, a certain motor power is required. Thus, the cutting depth is related to the motor power. Three, the MRE can be used to estimate the amount of metal that would be removed if the motor were set at a specific power.

Generally, the metal removal area equation (MRE) can be used to determine train speed, motor power, and area removed. Train speed may be described as a function of the maximum target removal area based on the rail profile and difference curve, average rotational velocity of grinding stones of the grinder, shear strength of the rail, the sum of the number of grits on the surface of the grinding stones, practical maximum and minimum grinding motor power, and practical maximum and minimum grinding train speed. Motor power may be described as a function of target removal area based on the rail profile and difference curve, velocity of the train, average rotational velocity of the grinding stones of the grinder, practical maximum and minimum grinding motor power, and practical maximum and minimum grinding train speed. The metal area removed may be described as a function of the power setting of the current motor in the calculation, the velocity of the train, average rotational velocity of the grinding stones of the grinder, practical maximum and minimum grinding motor power, and practical maximum and minimum grinding train speed.

The processes described herein may be implemented on a computer associated with the grinding vehicle. The computer may be disposed on the grinding vehicle, or it may be located remote of the grinding vehicle, with instructions sent to the grinding vehicle. In one embodiment, the computer for implementing one or more of the processes described herein includes a processor configured to execute at least one program stored in memory for the purposes of processing data to perform one or more of the techniques that are described herein. The processor may be coupled to a communication interface to receive remote sensing data, such as the rail profile data and corrugation measurements. The processor may also receive the sensing data via an input/output block. In addition to storing instructions for the program, the memory may store preliminary, intermediate and final datasets involved in the techniques that are described herein. Among its other features, the computer or data processing system may include a display interface and a display that displays the various data that is generated as described herein. It will be appreciated that the computer or data processing system shown in FIG. 11 is merely exemplary (for example, the display may be separate from the computer, etc) in nature and is not limiting of the systems and methods described herein.

Figure 11:
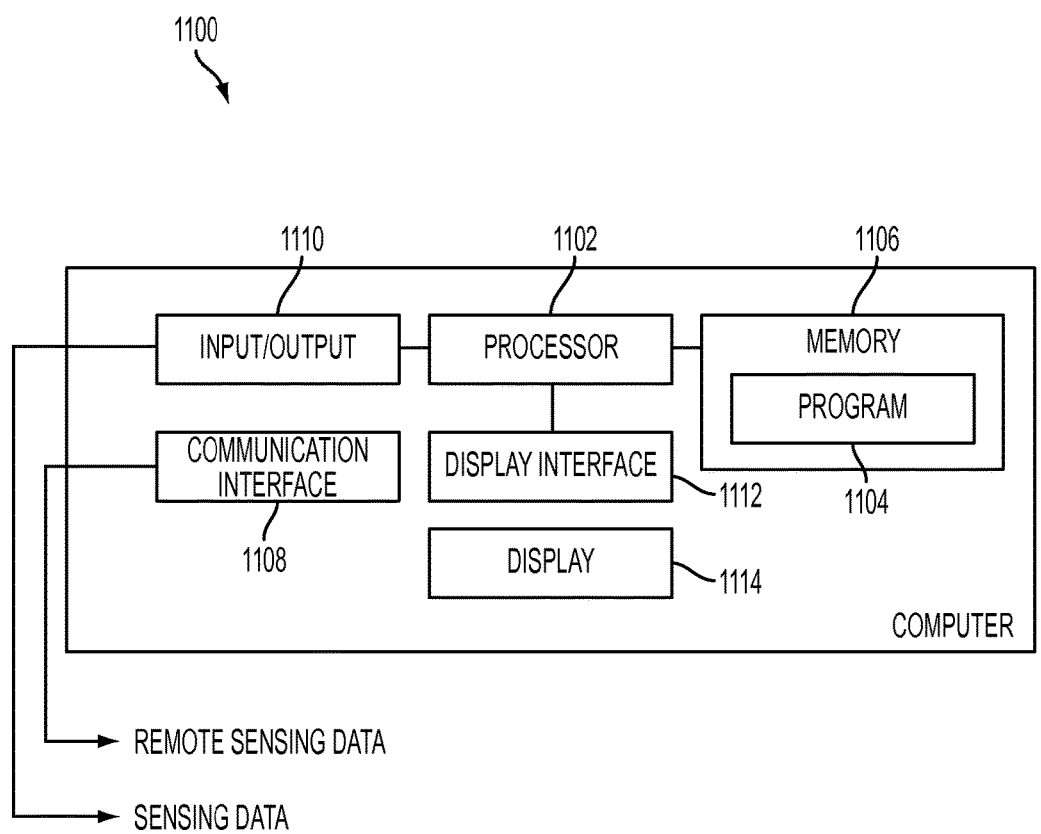
FIG. 11 is an exemplary rail computing apparatus.

FIG. 11 illustrates a data processing system 1100 for carrying out methods according to one embodiment of the present disclosure. The data processing system 1100 may include a processor 1102 configured to execute at least one program 1104 stored in a memory 1106 for the purposes of processing data to perform one or more of the techniques that are described herein. The processor 1102 may be coupled to a communication interface 1108 to receive remote sensing data. The processor 1102 may also receive the sensing data via an input/output block 1110. In addition to storing instructions for the program, the memory 1106 may store preliminary, intermediate, and final datasets involved in the techniques that are described herein. Among its other features, the computer or data processing system 1100 may also include a display interface 1112 and a display 1114 that displays the various data that is generated as described herein. It will be appreciated that the computer or data processing system 1100 shown in FIG. 11 is merely exemplary (for example, the display may be separate from the computer, omitted, etc.) in nature and is not limiting of the systems and methods described herein.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A rail grinding vehicle, comprising:
   a rail measurement system configured to obtain a profile of a rail by measurement;
   a first grinding motor;
   a second grinding motor;
   an actuation system respectively coupled to the first grinding motor and the second grinding motor; and
   a controller configured to
      cause the actuation system to position the first grinding motor relative to the rail at an orientation selected based on a comparison of the profile of the rail and a rail template,
      cause the actuation system to position the second grinding motor relative to the rail at an orientation selected based on a comparison of a model of the rail template updated to estimate metal removed by the first grinder and a rail template,
      determine at least one of a wavelength or an amplitude of corrugation of the rail,
      select one of a grinding for profile mode and a grinding for corrugation mode based on the wavelength or the amplitude of the corrugation,
      in response to the grinding for profile mode being selected, cause the first and second grinding motor to grind the rail for profile, and
      in response to the grinding for corrugation mode being selected, cause the first and second grinding motors to grind the rail for corrugation, wherein
   the controller is configured to
      (a) compare the wavelength of the corrugation of the rail and a size of a grinding stone of at least one of the first and second grinding motors, and to select the grinding for profile mode based on the comparison,
      (b) compare the amplitude of the corrugation of the rail and a threshold, and to select the grinding for corrugation mode if the amplitude is above the threshold, or
      both (a) and (b).

2. The rail grinding vehicle of claim 1, wherein the rail measurement system includes a laser measurement system.

3. The rail grinding vehicle of claim 1, wherein the first and second grinding motors are configured to be oriented at a top surface of the rail if the grinding for corrugation mode is selected.

4. The rail grinding vehicle of claim 1, wherein the controller is configured to set a speed of the vehicle based on the comparison of the profile of the rail and the rail template.

5. The rail grinding vehicle of claim 1, wherein the controller is configured to determining a difference result between the profile of the rail and the rail template, to determine a peak in the difference result, and to set the orientation of at least one of the first and second grinding motors at the peak.

6. The rail grinding vehicle of claim 5, wherein the controller is configured to set the power of at least one of the first and second grinding motors based on a magnitude of the difference result at the peak.

7. The rail grinding vehicle of claim 1, wherein the controller is configured to estimate an effect of the first grinding motor's orientation, power, and speed to provide an estimated rail profile.

8. The rail grinding vehicle of claim 1, wherein the controller is configured to select the one of the grinding for profile mode and the grinding for corrugation mode based on the amplitude of the corrugation.

9. The rail grinding vehicle of claim 1, wherein the controller is configured to select the one of the grinding for profile mode and the grinding for corrugation mode based on the wavelength of the corrugation.

10. The rail grinding vehicle of claim 1, wherein the controller is configured to cause the first and second grinding motors to be positioned at a top surface of a rail in the grinding for corrugation mode.

11. The rail grinding vehicle of claim 1, wherein the wavelength or amplitude of the corrugation of the rail represents raised areas or depressed areas along a longitudinal profile of the rail.

12. The rail grinding vehicle of claim 1, wherein the wavelength or amplitude of the corrugation of the rail is a longitudinal attribute of the rail distinct from a transverse, cross-sectional attribute of the rail.

13. The rail grinding vehicle of claim 1, wherein the grinding for profile mode is distinct from the grinding for corrugation mode.

14. The rail grinding vehicle of claim 13, wherein
   the rail grinding vehicle includes a plurality of grinding motors that includes the first and second grinding motors, and
   in the grinding for profile mode, the controller is configured to cause the actuation system to position the plurality of grinding motors on multiple distinct surfaces of the rail.

15. The rail grinding vehicle of claim 14, wherein the multiple distinct surfaces include a top surface of the rail and a side surface of the rail.

16. The rail grinding vehicle of claim 14, wherein in the grinding for corrugation mode, the controller is configured to cause the actuation system to position the plurality of grinding motors such that more of the grinding motors are positioned at a top surface of the rail than in the grinding for profile mode.

17. A rail grinding vehicle, comprising:
   a rail measurement system configured to obtain a profile of a rail by measurement;
   a plurality of grinding motors;
   an actuation system respectively coupled to the grinding motors; and
   a controller configured to
      calculate a corrugation quality index of the rail;
      compare the corrugation quality index to a threshold;

select a grinding for corrugation mode if the corrugation quality index is below the threshold;

select a grinding for profile mode if the corrugation quality index is above the threshold;

in response to the grinding for profile mode being selected, determine a first peak in a difference result between the profile of the rail and a rail template, update the profile of the rail to estimate metal removed by a first of the grinding motors being positioned at the first peak, determine a second peak in a difference result between the updated profile of the rail and the rail template, and cause the actuation system to position the first of the grinding motors at the first peak and a second of the grinding motors at the second peak; and in response to the grinding for corrugation mode being selected, cause the actuation system to position the grinding motors such that more of the grinding motors are positioned at a top surface of the rail than in the grinding for profile mode.

18. The rail grinding vehicle of claim 17, wherein the controller is configured to calculate the corrugation quality index as a ratio of generated dynamic impact to a predetermined specification of dynamic impact based on corrugation of the rail.

19. The rail grinding vehicle of claim 17, wherein the rail measurement system includes a laser measurement system.

20. The rail grinding vehicle of claim 17 wherein the controller is configured to set a speed of the vehicle based on the comparison of the profile of the rail and the rail template.

* * * * *